United States Patent [19]
Choi

[11] Patent Number: 5,704,563
[45] Date of Patent: Jan. 6, 1998

[54] REEL-TABLE DRIVING MECHANISM WITH IDLER FRICTION WHEEL AND REEL FRICTION WHEEL FOR USE IN TAPE RECORDING/REPRODUCING APPARATUS

[75] Inventor: Do Young Choi, Suwon, Rep. of Korea

[73] Assignee: Samsung Electronics Co., Ltd., Kyungki-Do, Rep. of Korea

[21] Appl. No.: 659,184

[22] Filed: Jun. 6, 1996

[30] Foreign Application Priority Data

Jun. 30, 1995 [KR] Rep. of Korea .................. 95-19019

[51] Int. Cl.⁶ ............................................. G11B 15/32
[52] U.S. Cl. ............................................. 242/356
[58] Field of Search ........................ 242/356.7, 356, 242/356.2, 356.3, 356.4

[56] References Cited

U.S. PATENT DOCUMENTS

| | | | |
|---|---|---|---|
| 1,655,299 | 1/1928 | Thornton | 242/356.7 X |
| 3,085,759 | 4/1963 | Guest | 242/356.7 X |
| 3,888,432 | 6/1975 | Katoh | 242/356.7 X |
| 3,973,743 | 8/1976 | Suzuki | 242/356.7 X |
| 4,133,498 | 1/1979 | Laufer | 242/356.4 |
| 4,173,320 | 11/1979 | Schatteman | 242/356.4 X |

FOREIGN PATENT DOCUMENTS 54-5706  1/1979  Japan ................ 242/356.7

*Primary Examiner*—Daniel P. Stodola
*Assistant Examiner*—Gregory J. Strimbu
*Attorney, Agent, or Firm*—Sughrue, Mion, Zinn, Macpeak & Seas, PLLC

[57] ABSTRACT

A reel-table driving mechanism of a tape recording/reproducing apparatus is operative to selectively drive two reel-tables. An idler has an idler friction wheel sharing a common shaft with an idler gearing portion. Each reel-table has a reel friction wheel rotating while making contact with the idler friction wheel which ensures the idler gearing portion meshes with the reel gear while maintaining an appropriate distance between the shafts of the reel table and the idler.

8 Claims, 3 Drawing Sheets

REEL-TABLE DRIVING MECHANISM WITH IDLER FRICTION WHEEL AND REEL FRICTION WHEEL FOR USE IN TAPE RECORDING/REPRODUCING APPARATUS

BACKGROUND OF THE INVENTION

The present invention relates to a reel-table driving mechanism for use in a tape recording/reproducing apparatus and, more particularly, to a reel-table driving mechanism for use in a tape recording/reproducing apparatus for selectively driving a supply reel-table and a take-up reel-table by a capstan motor.

The operational state of a typical tape recording/reproducing apparatus such as a video tape recorder or a camera coupled with a video tape recorder is shown in FIG. 1. A tape is selectively taken up on a supply reel-table or a take-up reel-table by being guided by a plurality of tape guide members (not shown) after being loaded onto a head drum 1 by a loading apparatus (not shown) from a tape cassette (not shown) on reel tables 10 and 20. At this time, one of the reel-tables 10 and 20 is selectively driven by a capstan motor 2. To drive the reel-table 10 or 20, a driving gear 40 driven by the capstan motor 2, and a moving idler 42, which engages with the driving gear 40 and is connected to the driving gear 40 by a connection lever 41, are installed between the two reel-tables 10 and 20. The idler 42 selectively rotates the reel-table 10 or 20 while moving according to the direction of rotation of the driving gear 40.

As shown in FIGS. 2 and 3, in order to guide the movement of the idler 42 and to stabilize the meshing with the reel-tables 10 and 20, a cover 30 is installed between the two reel-tables 10 and 20 for guiding the idler 42. A guide slot 31 formed within the cover allows a shaft 42a of the idler 42 to slide between the reel-tables 10 and 20 to selectively engage with either the reel-table 10 or the reel-table 20. The idler 42 moves toward the reel-tables 10 and 20 to make the shaft 42a contact with the ends of the guide slot so that a gearing portion 42b of the idler 42 engages with a reel gear 11 stably.

In the previously proposed reel-table driving mechanism, during the meshing of the idler 42 with the reel-tables 10 and 20, a vibration generated between the shaft 42a and the cover 30 causes noise and jitter.

Also, the cover 30 for guiding the idler 42 is required in the previously proposed reel-table driving mechanism, thereby complicating the structure thereof.

SUMMARY OF THE INVENTION

It is an object of the present invention to provide an improved reel-table driving mechanism of a tape recording/reproducing apparatus having a simple structure which makes little noise in driving the reel-tables.

To achieve one aspect of the above object, there is provided a reel-table driving mechanism of a tape recording/reproducing apparatus, comprising two reel-tables each having a reel gear formed thereon and an idler movably installed between the reel-tables and having a gearing portion formed thereon for selectively engaging with the reel gears of the reel-tables, wherein the idler has an idler friction wheel sharing a common shaft on which the gearing portion is formed and wherein each of the reel-tables has a reel friction wheel which is operative to make contact with the idler friction wheel.

To achieve another aspect of the above object, there is provided a reel-table driving mechanism of a tape recording/reproducing apparatus comprising two reel-tables each having a reel gear formed thereon, an idler movably installed between the reel-tables and having a gearing portion formed thereon for selectively engaging with the reel gears of the reel-tables, a capstan motor, and a driving gear driven by the capstan motor to rotate the idler, wherein the idler has an idler friction wheel sharing a common shaft on which the gearing portion is formed and wherein each of the reel-tables has a reel friction wheel which is operative to make contact with the idler friction wheel.

The idler friction wheel and the reel friction wheel may be made of rubber.

Moreover, the idler friction wheel and the gearing portion may be formed separately, or the idler friction wheel and the gearing portion may be attached to each other.

According to the present invention, when the idler makes contact with the selected reel-table, the gearing portion of the idler engages with the reel gear and the idler friction wheel makes contact with the reel friction wheel. The idler friction wheel rotates while being guided to the reel table friction wheel to facilitate the stable meshing of the idler gear with the reel gear.

Therefore, a reel-table driving mechanism according to the present invention does not need a cover as compared to the previously proposed driving mechanism, thus making the structure thereof simpler and reducing the amount of noise generated.

BRIEF DESCRIPTION OF THE DRAWINGS

The above objects and advantages of the present invention will become more apparent by describing in detail a preferred embodiment thereof with reference to the accompanying drawings, in which.

DETAILED DESCRIPTION OF THE PREFERRED EMBODIMENT

Figure 1:
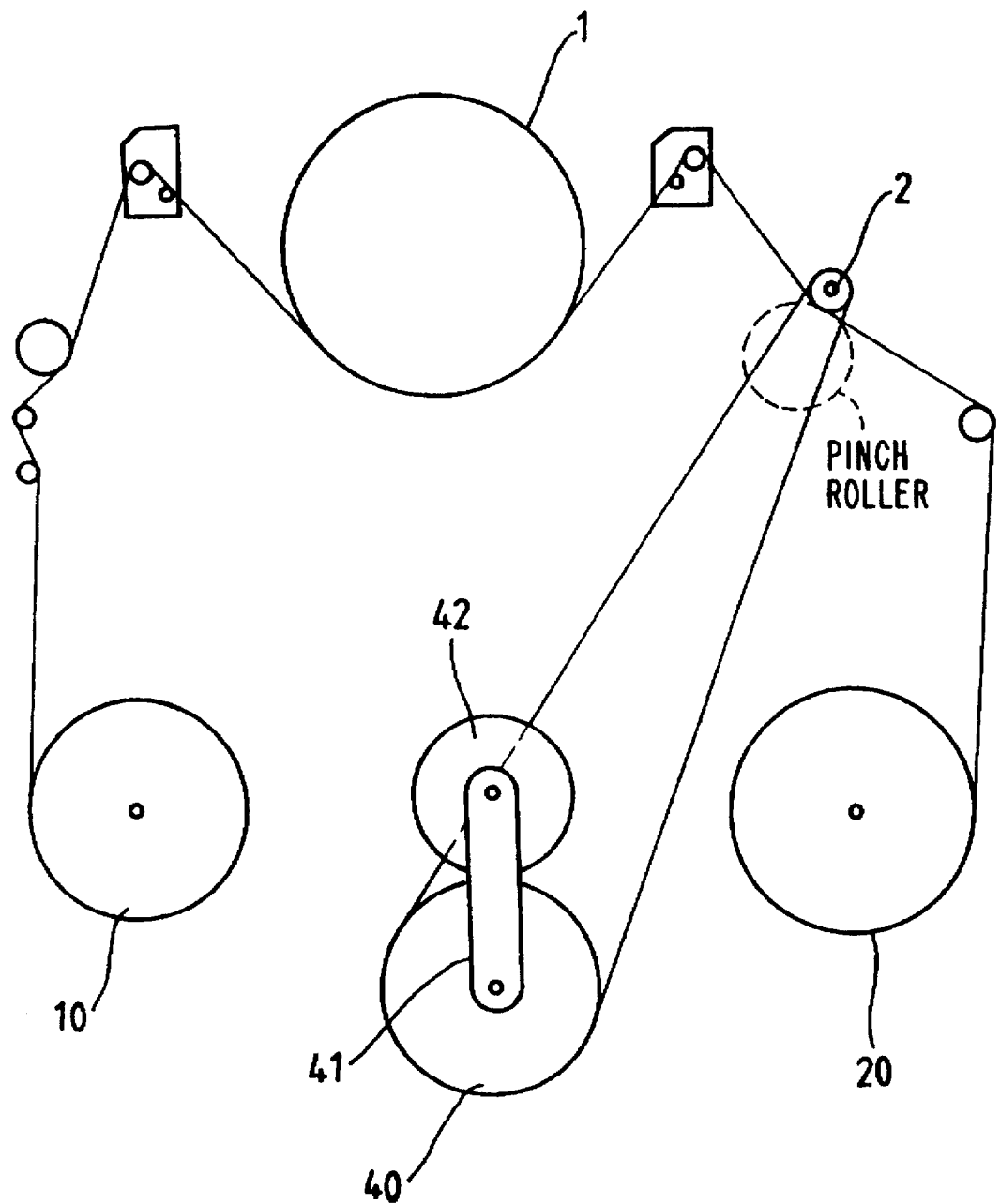
FIG. 1 shows the operational state of a typical tape recording/reproducing apparatus.
Figure 2:
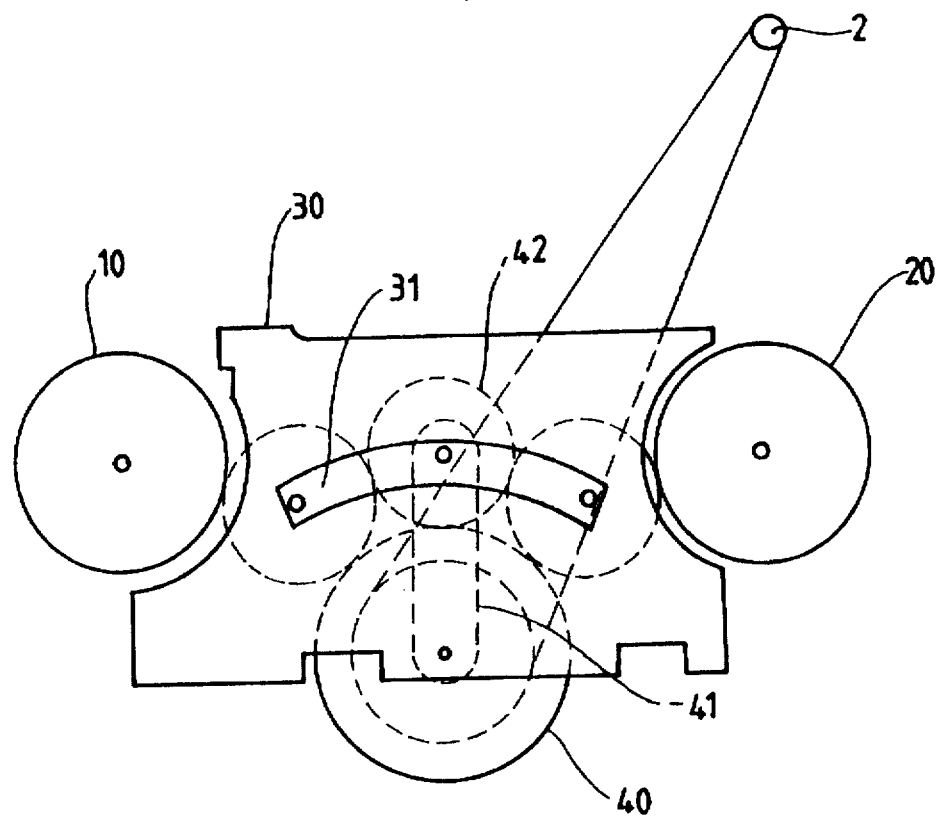
FIG. 2 is a schematic view of a previously proposed reel-table driving mechanism of a tape recording/reproducing apparatus.
Figure 3:
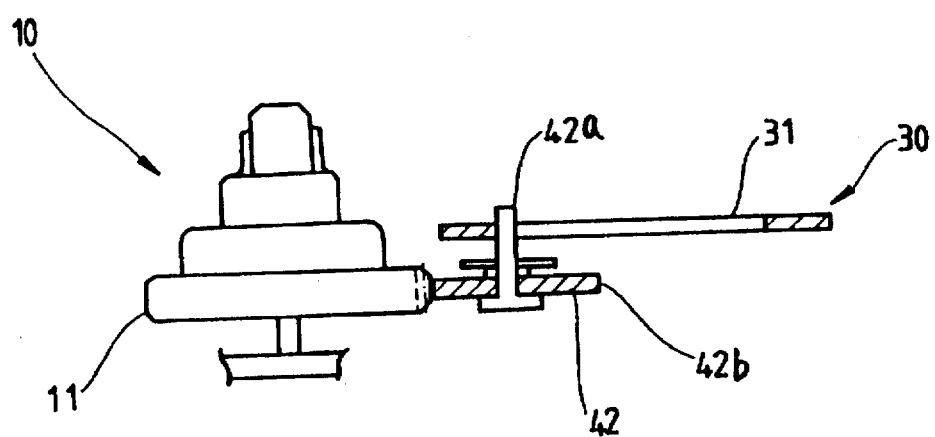
FIG. 3 is a sectional view of the main portions of FIG. 2.
Figure 4:
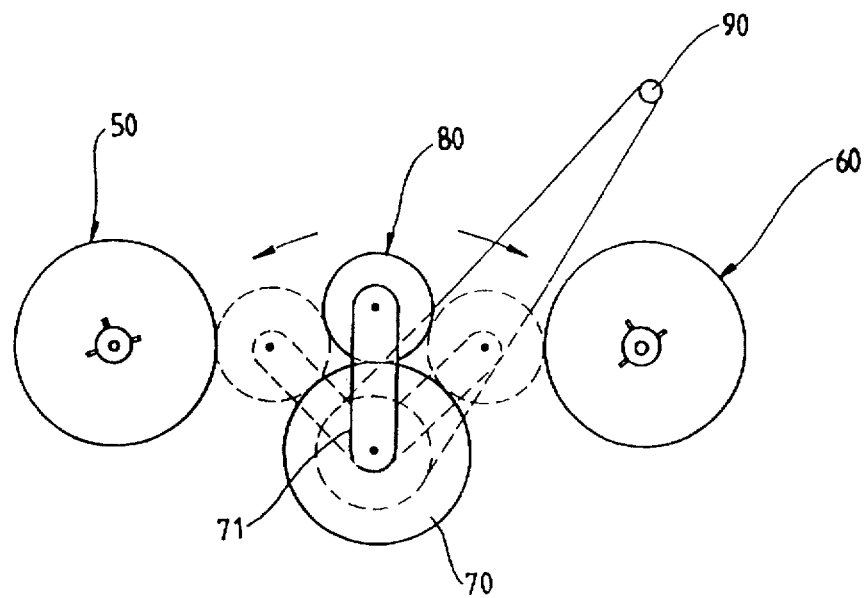
FIG. 4 is a schematic view of the reel-table driving mechanism of a tape recording/reproducing apparatus according to the present invention.
Figure 5:
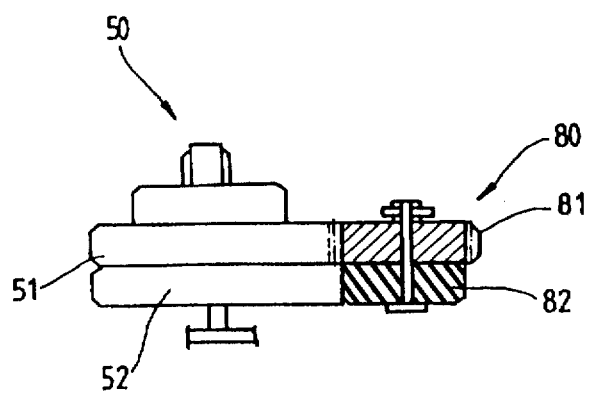
FIG. 5 is a sectional view of the main portions of FIG. 4.

Referring to FIGS. 4 and 5, a reel-table driving mechanism according to the present invention includes a driving gear 70 driven by a capstan motor 90, installed between a supply reel-table 50 and a take-up reel-table 60. The driving gear 70 meshes with an idler 80 which is supported by a connection lever 71. The idler 80 moves to either the supply reel-table 50 or the take-up reel-table 60 depending on the direction of rotation of the driving gear 70.

Figure 6:
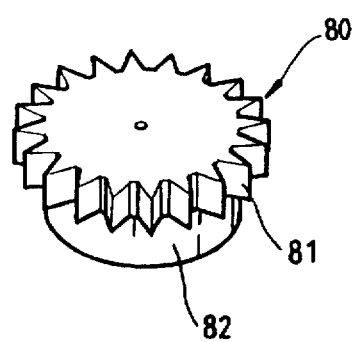
FIG. 6 is a perspective view of the idler portion of FIG. 5.

In the idler 80, as shown in FIGS. 5 and 6, a gearing portion 81 and a friction wheel 82 share the same shaft and are attached to each other. The reel-table 50 has a reel gear 51 which engages with the gearing portion 81 of the idler 80 and a reel friction wheel 52 which makes contact with the idler friction wheel 82. Similarly, the reel-table 60 has a reel gear (not shown) and a reel friction wheel (not shown), of the same structure as those of the reel gear 51 and reel friction wheel 52.

The idler friction wheel 82 and the gearing portion 81 may be formed separately to allow them to move relative to one another. Also, the idler friction wheel 82 and the reel friction wheel 52 are preferably made of rubber.

The reel-table driving mechanism according to the present invention having the above structure operates as follows. In the REVIEW/REWIND mode, a counter-clockwise rotation of the driving gear 70 by the capstan motor 90 makes the idler 80 move to the left and engage with the supply reel-table 50. At this time, the idler friction wheel 82 makes contact with the supply reel friction wheel 52 and the gearing portion 81 of the idler 80 engages with the reel gear 51. Therefore, the contact of the idler friction wheel 82 with the supply reel friction wheel 52 makes the gearing portion 81 of the idler 80 mesh with the reel gear 51 while maintaining an appropriate distance between the shafts of the reel-table 50 and the idler 80. As described above, the idler friction wheel 82 guides the gearing portion 81 to stably engage with the reel gear 51 and the power of the capstan motor 90 is smoothly transmitted to the supply reel-table 50 by the meshing of the gearing portion 81 with the reel gear 51.

In the PLAY/FORWARD mode, a clockwise rotation of the driving gear 70 by the capstan motor 90 moves the idler 80 to the right and thus, the idler 80 engages with the take-up reel-table 60. In the same manner as described above for the driving of the supply reel-table 50, take-up reel-table 60 is driven.

The reel-table driving mechanism according to the present invention has the following advantages. First, unlike the previously proposed driving mechanism which requires a cover to guide the idler, the reel-table driving mechanism is simpler in structure and easier to assemble by forming only an idler friction wheel 82 and reel friction wheels corresponding to the idler friction wheel 82. Also, in the reel-table driving mechanism according to the present invention, noise and vibration are reduced due to the idler being guided by the friction wheels 82 and 52 made of rubber.

It is contemplated that numerous modifications may be made to the reel-table driving mechanism of the present invention without departing from the spirit and scope of the invention as defined in the following claims.

What is claimed is:

1. A reel-table driving mechanism for use in a tape recording/reproducing apparatus, comprising:

two reel-tables each having a reel gear formed thereon;

an idler movably installed between said reel-tables and having a gearing portion formed thereon for selectively engaging with the reel gears of said reel-tables, wherein said idler has an idler friction wheel sharing a common shaft with said idler on which said gearing portion is formed and wherein each of said reel-tables has a reel friction wheel which makes contact with an outer peripheral surface of said idler friction wheel while the gearing portion meshes with the reel gear and maintains an appropriate distance between a shaft of each of the reel tables and the shaft of the idler.

2. The reel-table driving mechanism as claimed in claim 1, wherein said idler friction wheel and said reel friction wheel are made of rubber.

3. The reel-table driving mechanism as claimed in claim 1, wherein said idler friction wheel and said gearing portion are formed separately so as to move relative with respect to one another.

4. The reel-table driving mechanism as claimed in claim 1, wherein said idler friction wheel and said gearing portion are attached to each other.

5. A reel-table driving mechanism comprising:

two reel-tables each having a reel gear formed thereon;

an idler movably installed between said reel-tables and having a gearing portion formed thereon for selectively engaging with the reel gears of said reel-tables;

a capstan motor; and a driving gear driven by said capstan motor to rotate said idler, wherein said idler has an idler friction wheel sharing a common shaft with said idler on which said gearing portion is formed and wherein each of said reel-tables has a reel friction wheel which makes contact with an outer peripheral surface of said idler friction wheel while the gearing portion meshes with the reel gear and maintains an appropriate distance between a shaft of each of the reel tables and the shaft of the idler.

6. The reel-table driving mechanism as claimed in claim 5, wherein said idler friction wheel and said reel friction wheel are made of rubber.

7. The reel-table driving mechanism as claimed in claim 5, wherein said idler friction wheel and said gearing portion are formed separately.

8. The reel-table driving mechanism as claimed in claim 5, wherein said idler friction wheel and said gearing portion are attached to each other.

* * * * *